United States Patent [19]

Tait et al.

[11] 3,747,018

[45] July 17, 1973

[54] PLATELET SEMICONDUCTIVE LASER

[75] Inventors: William C. Tait, Oak Park Heights; Donald A. Campbell; James R. Packard, both of St. Paul; Gunther H. Dierssen, White Bear Lake, all of Minn.

[73] Assignee: Minnesota Mining and Manufacturing Company, St. Paul, Minn.

[22] Filed: Mar. 16, 1972

[21] Appl. No.: 124,949

Related U.S. Application Data

[63] Continuation of Ser. No. 588,906, Oct. 24, 1966, abandoned.

[52] U.S. Cl. ................................ 331/94.5, 250/199

[51] Int. Cl. ........ H01s 3/09, H01s 3/06, H01s 3/18

[58] Field of Search .................... 331/94.5; 250/199; 313/92, 108

[56] References Cited

UNITED STATES PATENTS

| | | | |
|---|---|---|---|
| 3,375,465 | 3/1968 | Brixner | 331/94.5 |
| 3,393,373 | 7/1968 | Stimler | 331/94.5 |
| 3,655,986 | 4/1972 | Lax | 250/199 |

FOREIGN PATENTS OR APPLICATIONS

| | | | |
|---|---|---|---|
| 38,100 | 4/1965 | Germany | 23/294 |

OTHER PUBLICATIONS

Thomas et al., J. Applied Physics, 33, (11), Nov. 1962, pp. 3243–3249.

Brown et al., A.R.L. Tech. Doc. Rprt. 65–100, AF Contract AF-33(657)-7127, May 1965, pp. iii, ixx, 262–267.

Chem. Abstr. No. 17255e, Floegez et al., in Chem. Abstr. Vol. 63, No. 13, Dec. 20, 1965.

Basov, Physics of Quant. Electr. Conf. Proc. (San Juan, P.R., June 28–30, 1965), New York, McGraw-Hill, Jan. 26, 1966, pp. 411–423.

Klein, Physics of Quant. Electr. Conf. Proc. (San Juan, P.R.) June 28–30, 1965) New York, McGraw-Hill, Jan. 26, 1966, pp. 424–433.

Basov et al., Soviet-Physics-Doklady 9, (4), Oct. 1964, p. 288.

Coleman et al., Proc. IEEE, 53, April 1965, pp. 419–20 TK 5700 F7

Stimler, Applied Optics, 4(5), May 1965 p. 626–628.

Lay, IEEE Spectrum, 2, July, 1965 pp. 62–75.

Benoit et al., C. R. Acad. Sci. Paris, 261, Dec. 20 1965, pp. 5428–5430.

Caset, Jr. et al. App. Phys. Lett., 8(5), Mar. 1, 1966, pp. 113–115.

Hurwitz, App. Phys. Lett., 8(5) Mar. 1, 1966 pp. 121–124.

Hurwitz, App. Phys. Lett., 8, (10), May 15, 1966, pp. 243–245.

Nicoll, App. Phys. Lett., 9(1), July 1, 1966, pp. 13–15.

Hurwitz, App. Phys. Lett. 9(3), Aug. 1, 1966, pp. 116–118.

Science Abstracts, Abstr. No. 13091, May 1964, p. 1170.

Laser Focus, Oct. 1, 1965, p. 3.

Komatsu et al., Japan J. Appl. Phys., 3 1964, pp. 733–734.

Basov et al., Soviet Phys. Jetp., 20 (41, April, 1965), pp. 1588–1590.

Ehrenberg et al., Proc. Phys. Soc., LXVI (12-B) Dec. 1953, p. 1057.

Basov, Science, 149 (3686) Aug. 20, 1965, pp. 821–827.

Popov – See pp 826–827 of Basov (Science).

Viscakas, Chem. Abstr. 62(6), Mar. 15, 1965, Abstr. No. 59670.

Vitrikhouskie et al., Soviet Physics – Solid State, 3, (5), Nov. 1961, pp. 48–51.

*Primary Examiner*—Ronald L. Wibert
*Assistant Examiner*—R. J. Webster
*Attorney*—Alexander, Sell, Steldt & Delahunt

[57] ABSTRACT

A laser device comprising a naturally grown single crystal semiconductor platelet having a power conversion efficiency of at least $10^{-2}$ percent and a means for producing and impinging upon the crystal a beam of electrons of energy less than 75 KeV.

10 Claims, 10 Drawing Figures

PLATELET SEMICONDUCTIVE LASER

CROSS REFERENCE TO RELATED APPLICATION

This application is a continuation of a copending application Ser. No. 588,906, filed on Oct. 24, 1966 now abandoned.

This invention relates to a device for producing electromagnetic radiation by stimulated emission and more particularly to a device for producing electromagnetic radiation from a naturally grown single crystal platelet of a semiconductor by exciting the crystal with a source of energy having at least a sufficient incident intensity to cause a population inversion within the crystal wherein electromagnetic radiation is produced containing an emission line having a maximum output intensity occurring at a predetermined wavelength.

This invention is based upon the discovery that a cadmium selenide single crystal in the form of a naturally grown single crystal platelet having a high purity and low surface strain can be excited into stimulated emission by a source of energy of at least a predetermined incident intensity. The word "platelet" when used herein refers to a naturally grown single crystal flake which may or may not be fabricated into a resonant cavity as differentiated from a "single crystal wafer" which is originally cut from a bulk crystal and prepared by either mechanical or chemical polishing techniques. When the platelet is excited by such an energy source, a population inversion is achieved between levels of lower and higher energy resulting in electromagnetic radiation in the form of visible light in the red portion of the spectrum being produced by stimulated emission which exhibits line narrowing and superlinearity.

Semiconductor compounds, such as crystal wafers sliced from bulk crystals of gallium arsenide, indium arsenide and cadmium sulfide, have been bombarded with electrons whereupon laser action therefrom was observed. However, prior to this invention, laser action by excitation of a naturally grown single crystal platelet having a pair of spaced planar faces at least one of which is substantially optically smooth and at least two reflective edges positioned in a spaced relation to each other and extending between the planar faces wherein the reflective edges are perpendicular to at least said substantially optically smooth planar face was unknown.

Other semiconductor platelets in addition to cadmium selenide which are capable of exhibiting stimulated emission under appropriate conditions are ZnO, ZnS, ZnTe, ZnSe, CdS and CdTe and appropriate solid solutions thereof.

In one embodiment of the present invention, cadmium selenide can be excited into stimulated emission as evidenced by both line narrowing and superlinearity of output intensity. It has been found that electron beam bombardment of a naturally grown single crystal platelet of cadmium selenide having a high purity and a low surface strain can stimulate the platelet into laser action. Achievement of stimulated emission requires that the electrons from the electron beam have sufficient energy to cause electron penetration into the platelet resulting in a population inversion which produces the stimulated emission. When the source of energy is below a predetermined incident intensity, the intensity of the produced electromagnetic radiation is directly proportional to the source of incident intensity. The region wherein the radiation intensity is directly proportional to the incident intensity and wherein the platelet has not achieved stimulated emission is referred to as spontaneous emission.

When the platelet is irradiated by an electron beam having at least a predetermined incident intensity, a population inversion occurs within the crystal between levels of lower and higher energy. Increasing the incident intensity of the beam beyond a predetermined intensity causes the platelet to produce electromagnetic radiation exhibiting a superlinear dependence as a function of the incident intensity. When the incident intensity of the beam is increased from just below to just above the predetermined incident intensity required to cause a population inversion the electromagnetic radiation produced from the platelet abruptly increases at least an order of magnitude in response to a slight increase in the incident intensity of the beam. The laser action in this region of superlinearity is referred to as super radiance.

When the platelet is excited into stimulated emission it appears that, the resulting electromagnetic radiation contains an emission line having a maximum output intensity occuring at a predetermined wavelength wherein the emission line exhibits line narrowing near the predetermined wavelength when the platelet is excited into population inversion.

It has been found that naturally grown cadmium selenide single crystal platelets are easily cleaved whereupon the reflective edges are substantially parallel to each other to form a resonant cavity. It has been observed that a slight jar of the cadmium selenide platelet is sufficient to cleave the platelet into a resonant cavity which generally is referred to as a Fabry-Perot cavity wherein the reflective edges are aligned in an opposed parallel relationship. When the resonant cavity is irradiated by a predetermined source of energy, the crystal is excited into stimulated emission which occurs in the super radiance region. A further increase in the incident intensity causes the emitted electromagnetic radiation to reach a threshold level whereupon the radiation becomes coherent. The coherent radiation is produced by the crystal being in mode oscillations wherein the radiation is forced into at least one of a plurality of standing wave patterns maintained by the stimulated emission within the resonant cavity formed by the crystal. The coherent electromagnetic radiation output appears to become linear as a function of incident intensity after the platelet is excited into coherent emission. When the platelet is in mode oscillations, it is observed that the emission spectrum has a plurality of emission lines each of which are at a high output intensity level and each of which are separated by a predetermined wavelength. Laser action exhibiting coherent emission is referred to as the mode oscillation region.

In one embodiment, the present invention utilizes a cadmium selenide single crystal platelet which is cooled to a temperature near that of liquid helium, or about 9° K. An electron beam having a current of about seven milliamps and a voltage of 30 KV is used to excite the platelet. In this embodiment, the cadmium selenide platelet produces visible light by stimulated emission wherein the emission spectrum contains an emission line having a maximum output intensity occurring at about 6890 Angstroms A. The emission at about 6890 A exhibits line narrowing. The wavelength of the emission line after stimulated emission appears to have shifted slightly toward a higher wavelength compared to the wavelength of the emission line just prior to stimulated emission.

The primary advantage of the present invention is that a platelet of a semiconductor can be excited by a source of energy of a predetermined incident intensity to produce electromagnetic radiation by stimulated emission.

Another advantage of the present invention is that electromagnetic radiation produced by stimulated emission exhibits line narrowing.

A further advantage of the present invention is that electromagnetic radiation produced by stimulated emission from a cadmium selenide single crystal platelet exhibits super linear dependence on the intensity of the source of energy.

Yet another advantage of the present invention is the absence of a destruction layer in the single crystal platelet which permits stimulated emission in response to minimum penetration of the excitation source.

An additional advantage of the present invention is that a cadmium selenide single crystal platelet can be easily fabricated into a resonant cavity whereby visible coherent light is produced by stimulated emission of the crystal when the platelet is excited by an electron beam of a predetermined voltage and current density.

These and other advantages of the present invention can be determined by reference to the accompanying description and drawing wherein.

Figures 5, 6:
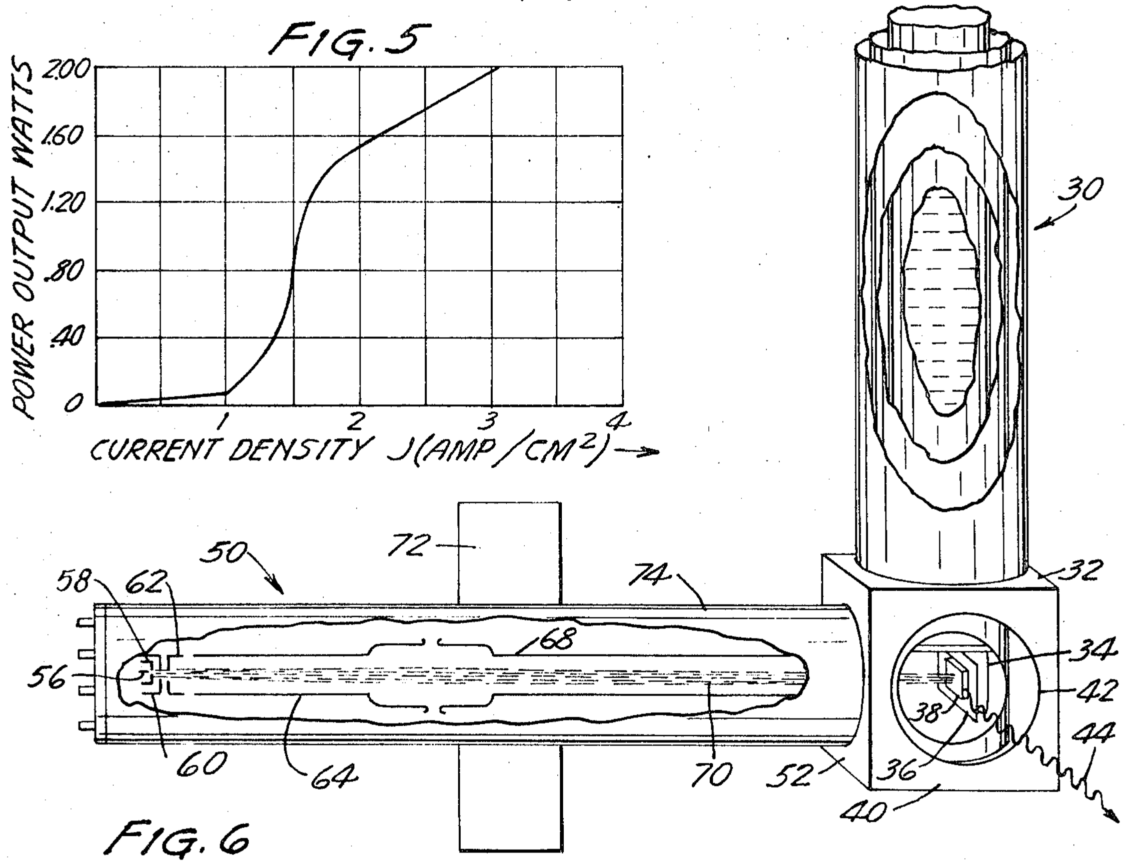

FIG. 5 is a graph illustrating a waveform which represents the power output from a cadmium selenide platelet as a function of current density of an exciting electron beam; and FIG. 6 is a diagrammatic representation of an electron beam pumping apparatus for producing electromagnetic radiation by stimulated emission from a naturally grown cadmium selenide single crystal platelet formed into a resonant cavity.

Briefly, the present invention relates to a device for producing electromagnetic radiation in the form of visible light by stimulated emission. A naturally grown single crystal platelet of a semiconductor having a pair of spaced planar faces, at least one of which is substantially optically smooth, and at least two reflective edges positioned in spaced relation to each other and extending between the planar faces to form a cavity, said reflective edges being perpendicular to at least said substantially optically smooth planar face is utilized as a cavity for the device. A means for exciting the platelet by directing at the substantially optically smooth planar faces a source of energy having at least sufficient incident intensity to stimulate the crystal into stimulated emission provides the excitation for driving the device into stimulated emission.

In one embodiment of the present invention, a semiconductor platelet comprising a II-VI compound was utilized. The II–VI compound was a naturally grown cadmium selenide single crystal platelet having a low level of impurity as measured in parts per million, for example less than 1 part per million, and a low surface strain in terms of surface dislocations, the absence of a destruction layer and the like.

Such a cadmium selenide single crystal platelet can be grown utilizing known vapor growing techniques in a furnace in an atmosphere of inert gas at elevated temperatures. The cadmium selenide platelet grows naturally from a surface or face of a cadmium selenide crystal. An exemplary process for growing such platelets is described by J. M. Stanley in his article "Vapor Phase Crystallization of Cadmium Sulfide Crystals" which appeared in the *Journal of Chem. Phys.*, Vol. 24, 1956, page 1279.

Selection of a naturally grown crystal avoids the disadvantage of a destruction layer which is present in single crystal wafers cut from bulk crystals and prepared by mechanical polishing techniques. In the absence of a destruction layer, the platelet can be excited into stimulated emission in response to minimum penetration of the excitation source, e.g., by an electron beam.

Figures 1, 2A, 2B:
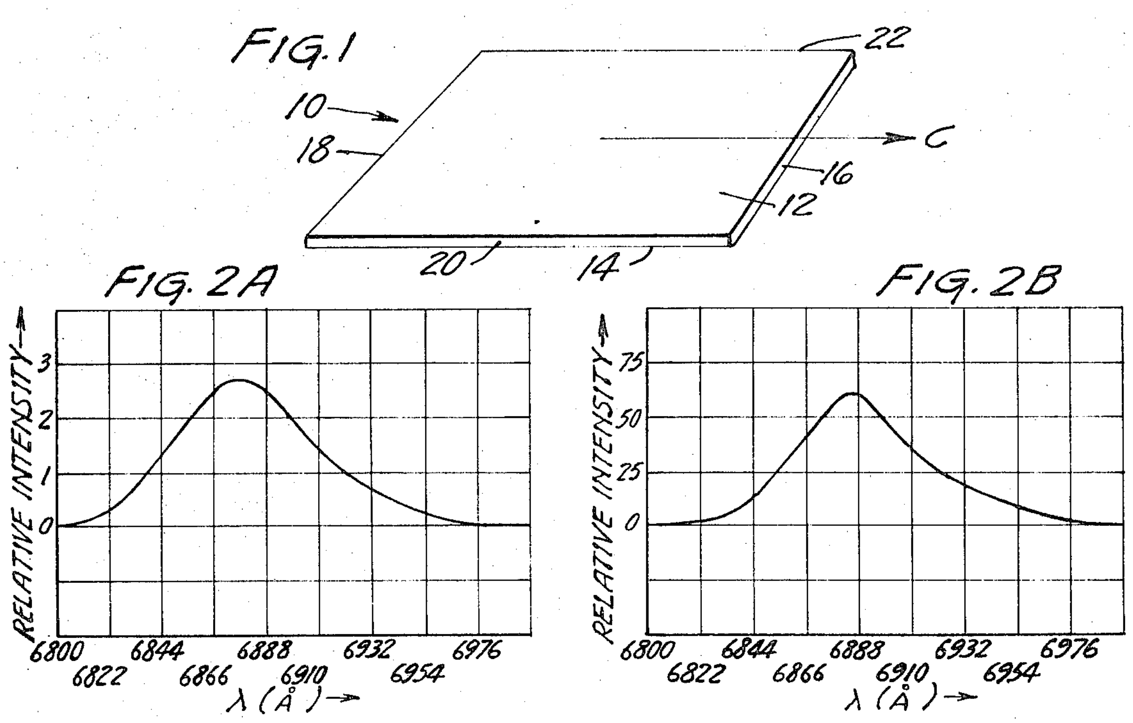
FIG. 1 is a diagrammatic illustration of a plate-let of a semiconductor.
FIGS. 2A and 2B are graphic representations of the emission spectrum of visible light from a naturally grown cadmium selenide single crystal platelet at a temperature of about 9° K illustrating line narrowing when the crystal is irradiated by an electron beam having a current just below and above threshold.

An example of a naturally grown single crystal platelet is a cadmium selenide platelet which is rectangular in shape. In FIG. 1, a naturally grown cadmium selenide single crystal platelet 10 has two natural, relatively large, substantially optically smooth, planar faces 12 and 14. In this particular embodiment, the platelet is relatively thin and it is advantageous to have both planar faces 12 and 14 parallel. However, in a relatively thick crystal platelet it is contemplated that at least one substantially optically smooth, planar face is adequate. The planar faces 12 and 14 are substantially parallel to each other and contain the *c*-axis of the crystal platelet 10. Additionally, the platelet 10 has two natural end surfaces 16 and 18 and at least two reflective edges 20 and 22 which are positioned in a spaced relation to each other to form a reflective cavity. The reflective edges 20 and 22 in this embodiment are parallel to each other, parallel to the direction of the *c*-axis, and perpendicular to and extend between the planar faces 12 and 14.

A typical platelet could have a thickness in the order of about 5 to 50 microns and larger, a length along its *c*-axis of about 2 to 3 millimeters and larger, and a width in the order of about one millimeter and larger.

Further, it is contemplated that the single crystal platelet could be in the form of a single crystal film grown or deposited on a substrate. Such a single crystal film could have relatively larger dimensions than those of a freely grown single crystal platelet because of the mechanical strength afforded by the substrate to the crystal formed thereon.

The naturally grown crystal platelets when fabricated into a resonant cavity have optically smooth planar faces which are perpendicular to and extend between the reflective edges forming the reflective cavity. Electrons from an exciting electron beam having a sufficiently high current density to cause a population inversion are directed at one optically smooth planar surface of the platelet and penetrate the platelet causing a population inversion which excites the platelet into stimulated emission. In such a platelet, the electrons may penetrate on the order of 4 to 5 microns as compared to about 10 microns for a single crystal wafer having a destruction layer.

The platelet 10 can be precisely fabricated into a Fabry-Perot cavity by selectively cleaving the platelet 10 such that the reflective edges 20 and 22 are substantially parallel to each other and to the *c*-axis and are perpendicular to the planar faces 12 and 14.

The cadmium selenide platelets utilized in the examples herein were selected to have a power conversion efficiency which was at least sufficient to permit stimulated emission when the platelet was bombarded by an electron beam of a predetermined voltage and current density. The term "power conversion efficiency" when used herein is meant to be the ratio between substantially all the electromagnetic power output emitted from one cavity surface and the power provided by the source of energy incident upon the platelet. It was observed that a power conversion efficiency of about $10^{-2}$ percent and greater was necessary for stimulated emission.

Referring now to FIGS. 2A and 2B, the graphs illustrate in a waveform the output emission intensity from a cadmium selenide platelet versus wavelength just below and above threshold for stimulated emission. The cadmium selenide platelet was in the form of a Fabry-Perot cavity having a cavity dimension of about 240 microns and a thickness of about 40 microns. The resulting emission from the crystal was in the red portion of the spectrum at about 6900 A when the crystal was cooled to a cryogenic temperature.

The cadmium selenide platelet was cooled to a temperature of about 9° K, near the temperature of liquid helium, and bombarded with a pulsed electron beam. The electron beam had a voltage of about 30 KV, a current of about 7 milliamps, and a current density of about one to two amps/cm². The pumping pulses had a duration of about 2 microseconds. The output intensity from the platelet 10 was found to be at a maximum at about 6880 A.

When the electron beam current was below threshold or less than about 4 to 5 milliamps, and upon sweeping the output intensity with a monochromator grating being moved at the rate of 666 A per 60 seconds, an emission line having a maximum output intensity was found to occur at about 6870 A . The half width of the emission line near 6870 A was about 75 A . FIG. 2A illustrates the emission spectrum of the cadmium selenide platelet at a temperature of about 9° K when the crystal is pumped by an electron beam having a current density which is insufficient to cause stimulated emission.

When the electron beam current was increased to exceed 5 milliamps, say up to about 8 milliamps, and upon sweeping the output intensity in the same manner as described, the output intensity was found to peak at about 6888 A . The emission line of the radiation peaked at a higher maximum output intensity, for example a relative intensity of about 60 above threshold versus a relative intensity of about 3 below threshold. The emission line exhibited line narrowing wherein the half width of the emission line was found to be about 55 A. FIG. 2B illustrates the emission spectrum emitted from the same cadmium selenide platelet excited by an electron beam having a current which is sufficient to cause stimulated emission.

Figure 3A:
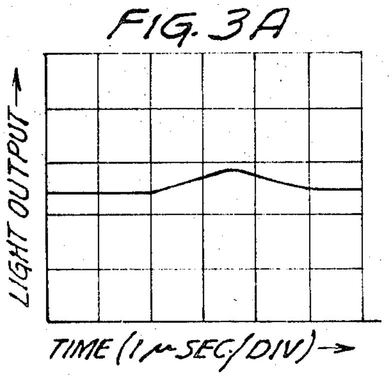
FIGS. 3A, 3B, 3C and 3D are graphic representations of the temporal characteristics of visible light from a cadmium selenide platelet illustrating superlinearity and electron beam current required to excite the platelet into laser action.
Figure 3B:
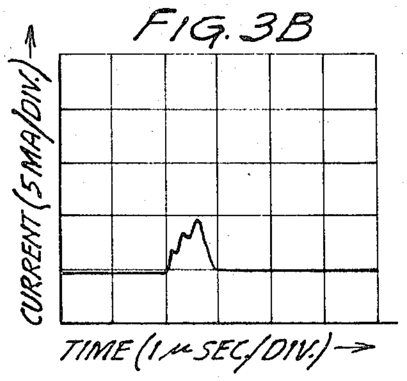
Figure 3C:
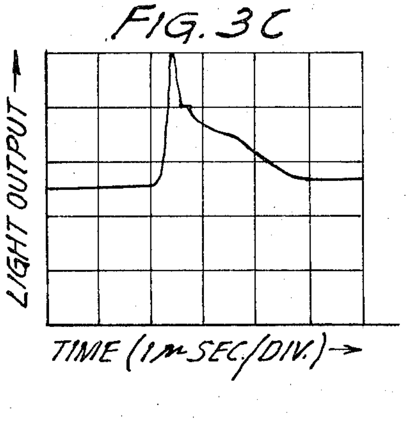
Figure 3D:
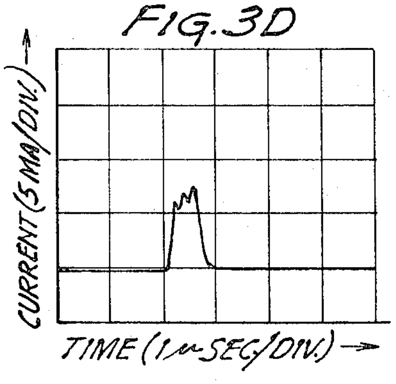

The graphs of FIGS. 3A and 3C illustrate waveforms depicting the electromagnetic radiation output through the monochrometer at about 6870 A as a function of time in response to beam currents having characteristics shown by the waveforms of FIGS. 3B and 3D, respectively.

When the beam current was increased from about 5 milliamps as illustrated in FIG. 3B to a peak current of about 7 milliamps as illustrated in FIG. 3D, the output intensity from the cadmium selenide platelet abruptly and sharply increased as evidenced by comparing the output intensities of FIGS. 3A and 3C. The output intensity of the emission line at about 6888 A exhibited a superlinear dependence on the current. The power conversion efficiency of this platelet was measured to be about $10^{-2}$ percent in the spontaneous emission region. When the power conversion efficiency of the platelet exceeded $10^{-2}$ percent, the cadmium selenide platelet was excited into stimulated emission.

Figure 4:
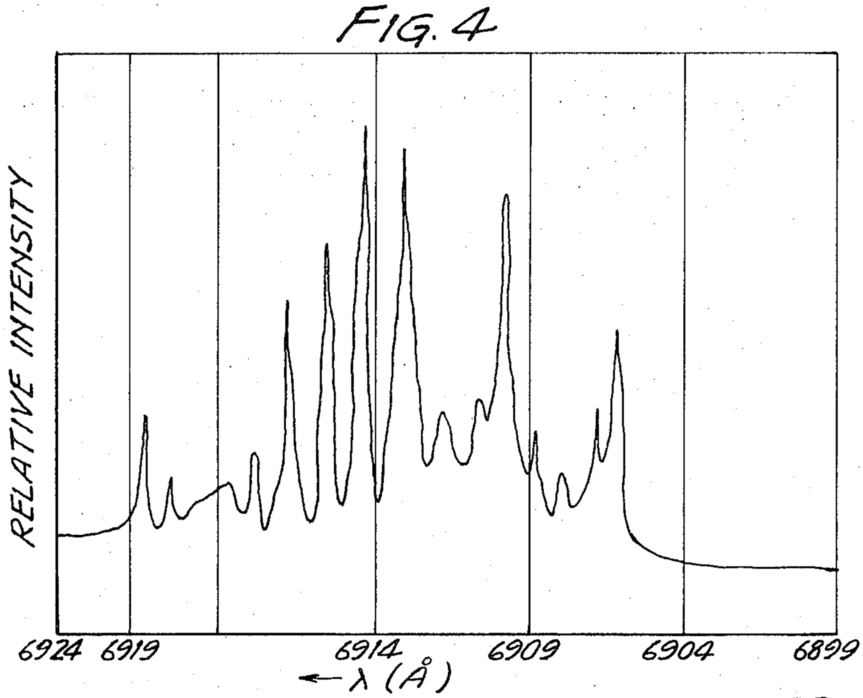
FIG. 4 is a graphic representation of the emission spectrum above threshold of a cadmium selenide platelet at a temperature near that of about 77° K pumped by a 50 KeV electron beam.

A different cadmium selenide platelet was cleaved into a Fabry-Perot cavity having a cavity dimension of about 190 microns. The crystal was cooled to a temperature near that of liquid nitrogen, or about 77° K, and bombarded with an electron beam having a current of about 12 milliamps at about 50 KV. The electron beam pumped the platelet with pulses having about a 100 nanosecond duration. This current was well above threshold and caused coherent stimulated emission or mode oscillations. The graph of FIG. 4 illustrates the emission spectrum of the cadmium selenide platelet in mode oscillation wherein the relative intensity is plotted as a function of wavelength.

The peak or average wavelength appears to occur experimentally around 69.15 A with a measured spacing between modes or a $\Delta\lambda$ of about 1 A.

The theoretical spacing between modes can be calculated by the following equation:

$$\Delta\lambda = \lambda^2/[2d(n-\lambda\ [dn/d\lambda]]$$

wherein:

$\lambda$ = average wavelength, $d$ = cavity dimenstion, $n$ = index of refraction for semiconductor, $dn/d\lambda$ = change in index of refraction per unit change in wavelength for the semiconductor at $\lambda$.

The $\lambda$, in the above example, was 6915 A ; $d$ equalled $190\mu$; $n$ equalled 2.8; and $dn/\lambda$ equalled $1.3 \times 10^{-3}\ A^{-1}$. This equation when solved using the above values yields a $\Delta\lambda$ of 1.07 A which clearly supports the $\Delta\lambda$ of about 1 A which was obtained by experimentation. The values for n and $dn/d\lambda$ were obtained from the reference R. B. Parsons, W. W. Wardzynski, A. D. Yoffe; Proceedings of the Royal Society (London) (1961) Volume 262, page 120.

Another cadmium selenide single crystal platelet was cleaved as described above having a cavity dimension of about 900 microns with the reflective edges partially aluminized to about 50 percent reflection. The crystal was cooled to a temperature near that of liquid nitrogen, or about 77° K, and bombarded with a pulsed electron beam having a variety of current densities from zero amps/cm² up to at least three amps/cm², an excitation potential of about 50 KV and pulse durations of about 100 nanoseconds. In one instance, the crystal was bombarded with an electron beam having a current density of 0.25 amps/cm$^2$, which was well below the threshold needed for stimulated emission. The cadmium selenide single crystal platelet exhibited only spontaneous emission. The graph of FIG. 5 illustrates the power output in watts versus current density in amps/cm$^2$ for the above platelet. The region of the curve below a power output of about 0.1 watt, which occurs at about 1 amp/cm$^2$, is the spontaneous emission region. It is within the spontaneous region that the power output is linear, that is, the power increases in proportion to the incident intensity of the electron beam.

The region of the curve located above the spontaneous region and below the power output of about 1.5 watts, which occurs at about 1.75 amps/cm$^2$, is the super radiance region. Within this region, the power output is superlinear, that is, the power increases nonlinearly with respect to the incident intensity of the electron beam.

The portion of the curve located above the super radiance region is the mode oscillation region. The platelet produces coherent stimulated emission due to the resonant cavity formed from the cleaved platelet. When the platelet was excited into mode oscillations, the power output appeared to be proportional to the current density of the electron beam.

The electromagnetic radiation emanating from this laser apparatus under conditions of stimulated emission is both temporally coherent, which describes the monochromatic nature of the emitted light, and spatially coherent, which describes the tendency of the emergent light to undergo little divergence.

FIG. 6 illustrates the apparatus which may be used for producing laser emission from a semiconductor platelet. Briefly, the laser apparatus comprises a cryostat tail section 30 containing a liquid refrigerant such as the liquid nitrogen or liquid helium which is ultimately used as the means for cooling the cadmium selenide platelet to a predetermined ambient temperature. The cryostat tail section 30 may be, for example, an optical access tail section for a standard helium cryostat.

A rectangular block housing member 32, which is about 2 inches on each side and constructed of nonmagnetic stainless steel, has a hollowed-out interior. The member 32 has an opening in one side which receives the cryostat tail section 30. Inside the interior of member 32, the tail section 30 terminates in a cold finger 34 to which is attached a copper holder 36. The copper holder 36 has the cleaved cadmium selenide platelet 38 attached thereto by means of an adhesive such as vacuum grease. The member 32 has, on an adjacent side 40, a quartz window 42 which is about one inch in diameter. The quartz window 42 allows the radiation from platelet 38 to exit from the member 32.

In this embodiment, the *c*-axis of the platelet is positioned parallel to the quartz window 42 and extends in a direction which is parallel to the axis of the tail section 30. When the platelet 38 is excited into stimulated emission, the electromagnetic radiation, illustrated as arrow 44, is emitted from the cleaved surfaces of platelet 38, and out of member 32 via the quartz window 42. The radiation 44 is detected by means of a photodetector (not shown) such as an RCA type 922.

Means for generating an energy beam such as an electron gun 50 is secured to the block housing 32 on a side 52, which side is adjacent to the side 40 containing the quartz window 42. The electron gun 50 may be, for example, a gun assembly replacement for a type 7NP4 tube. The electron gun 50 includes a separate filament 56 which heats an indirectly-heated cathode 58. The electrons emitted by cathode 58 are controlled by means of a first grid 60 and an accelerating grid 62. The focusing grid 64 focuses the accelerated electrons and an anode 68 accelerates the focused electron beam 70 onto the platelet 38. A means for deflecting and scanning the electron beam, such as a deflection coil 72, is positioned about an electron gun housing 74 in axial alignment with the electron beam 70. In one embodiment, the electron beam had a potential of about 50 KV and a current density in the order of 4 amps/cm$^2$ with a beam cross-section of about 500 microns in diameter.

In this embodiment, the *c*-axis of the cadmium selenide platelet is perpendicular to the electron beam 70 and radiation is produced in the TM mode. The electric field vector associated with the electromagnetic radiation appears to be in a direction perpendicular to the *c*-axis of the platelet.

However, it is contemplated that a cadmium selenide platelet can have the electron beam parallel to its *c*-axis and the resulting radiation in the TE mode with the electric field vector perpendicular to the *c*-axis.

A platelet semiconductor laser has wide utility. For example, the electromagnetic radiation produced by the laser can be utilized as an optical scanning device or as a means for transmitting information in the form of a modulated electromagnetic radiation. Such applications are merely exemplary and are not intended to limit the broad scope of this invention.

Having thus described a preferred embodiment of a platelet semiconductor laser, it is understood that modifications thereof are apparent to one having ordinary skill in the art and all such modifications and equivalents thereof are contemplated as being within the scope of the appended claims.

We claim:

1. A device for producing radiation by stimulated emission, comprising:

a naturally grown single crystal platelet of a semiconductor having a pair of spaced major faces at least one of which is substantially optically smooth and at least two planar parallel reflective edges positioned in spaced relation to each other and extending between said major faces to form a resonant cavity, said reflective edges being perpendicular to at least said substantially optically smooth major face, said platelet being selected to have a power conversion efficiency in excess of $10^{-2}$ percent; and means for exciting said platelet by directing at said substantially optically smooth major face a source of energy having at least sufficient incident intensity to excite said platelet into stimulated emission.

2. The device of claim 1 wherein said major faces of said naturally grown single crystal are planar, parallel and optically smooth and wherein said platelet is cleaved to form two spaced reflective edges which are perpendicular to said major faces to form a resonant cavity.

3. An electron beam pumped laser, comprising:

means for producing and directing an electron beam of a predetermined voltage and current density along a predetermined path; and a high purity cadmium selenide single crystal platelet of low surface strain having at least two spaced parallel reflective edges to form a resonant cavity and being disposed in said path to be bombarded by said electron beam, said cadmium selenide platelet being responsive to bombardment by said electron beam to produce visible light by stimulated emission which light emanates from said cavity through said reflective edges.

4. The electron beam pumped laser of claim 3 further including means for varying the ambient temperature of said platelet.

5. The electron beam pumped laser of claim 3 further including means operatively coupled to said electron beam producing means for modulating said electron beam to produce a series of pulses for exciting said platelet into stimulated emission.

6. A cadmium selenide laser for producing coherent stimulated emission in the visible spectrum, comprising:

a high purity cadmium selenide platelet of low surface strain formed into a Fabry-Perot cavity and having a *c*-axis which is parallel to the reflective edges of said platelet forming said cavity; and means for exciting said platelet with a series of electron beam pulses having sufficient voltage and current density to excite said platelet into mode oscillations, said electron beam being directed along a predetermined path to bombard said platelet perpendicular to said *c*-axis and the major faces of the platelet to produce electromagnetic radiation exhibiting temporally and spatially coherent emission wherein the emission spectrum comprises a series of spaced emission lines corresponding to cavity modes.

7. An electron beam pumped laser, comprising:

means for producing and directing an electron beam of a predetermined voltage and current density along a predetermined path; and a high purity single crystal semiconductor platelet of low surface strain having a power conversion efficiency in excess of $10^{-2}$ percent, having at least two spaced reflective edges to form a resonant cavity and being disposed in said path to be bombarded by said electron beam, said platelet being responsive to bombardment by said electron beam to produce electromagnetic radiation by stimulated emission which light emanates from said cavity through said reflective edges.

8. A device for producing electromagnetic radiation by stimulated emission comprising:

a naturally grown single crystal platelet of a semiconductor having a power conversion efficiency in excess of $10^{-2}$ percent and capable of stimulated emission when excited by a source of energy having a predetermined incident intensity, said platelet when excited into stimulated emission producing electromagnetic radiation which exhibits both line narrowing and superlinear dependence on said incident intensity, and means for bombarding said platelet with energy having at least said predetermined incident intensity to excite said platelet into stimulated emission.

9. The device of claim 8 wherein said platelet has at least two spaced reflective edges to form a resonant cavity.

10. The device of claim 9 wherein said platelet has a pair of spaced optically smooth faces and wherein said means for bombarding said platelet bombards one of said optically smooth faces.

* * * * *